United States Patent [19]
Tune

[11] 4,413,604
[45] Nov. 8, 1983

[54] FUEL BLENDING INSTALLATION

[75] Inventor: Herbert E. Tune, Epping, England

[73] Assignee: Star Engineering Applications Limited, Liverpool, England

[21] Appl. No.: 307,151

[22] Filed: Sep. 30, 1981

[30] Foreign Application Priority Data

Oct. 13, 1980 [GB] United Kingdom ............... 8032986

[51] Int. Cl.³ .................... F02M 37/04; F02B 7/02
[52] U.S. Cl. ............................ 123/515; 123/514; 123/575; 123/577
[58] Field of Search .............. 123/575–577, 123/514, 515

[56] References Cited

U.S. PATENT DOCUMENTS 2,758,579 8/1956 Pinotti .............................. 123/577
2,911,958 11/1959 Griep ............................... 123/577
2,958,317 11/1960 McNally ........................... 123/515

FOREIGN PATENT DOCUMENTS 610248 10/1948 United Kingdom ............... 123/514
2058211 4/1981 United Kingdom ............... 123/515

Primary Examiner—Charles J. Myhre
Assistant Examiner—E. Rollins Cross
Attorney, Agent, or Firm—Weinstein & Sutton

[57] ABSTRACT

A blending installation is described in which the grade of fuel is adjusted to enable an engine to use the most economical grade of fuel at any time. A circuit is connected to two reservoirs containing different grades of fuel. The fuel is constantly circulated by a pump in the circuit and fed to the engine. A pump meters the appropriate quantity of the higher grade fuel into the circuit and the balance of lower grade fuel is supplied by gravity feed into the circuit.

13 Claims, 1 Drawing Figure

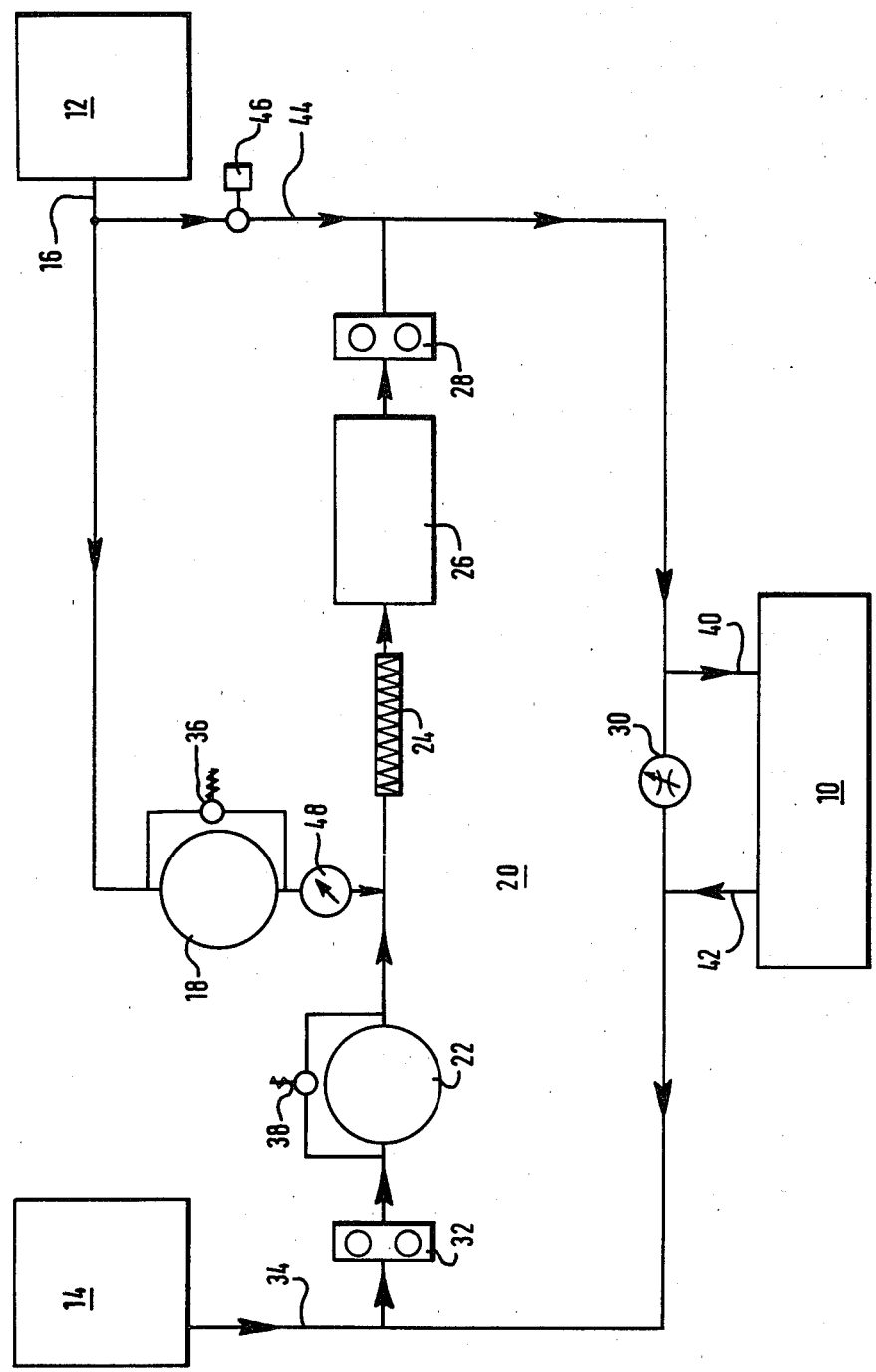

FUEL BLENDING INSTALLATION

The present invention relates to a fuel blending installation.

It is known that the combustion efficiency of certain engines, in particular diesel engines, varies in dependence upon the load conditions. When operating at a high load, the efficiency of burning in a diesel engine such as a marine diesel is sufficiently high to enable the engine to operate satisfactorily from a lower grade fuel having a higher viscosity, herein termed "heavy oil". On the other hand, when operating under low load conditions, the combustion efficiency is considerably lower necessitating the use of higher grade and more expensive fuel such as diesel oil.

In order to minimize running costs, it is known to change between heavy oil and diesel oil, depending on the load conditions. It is also known to provide a third tank containing an intermediate grade produced by mixing these two grades of fuel. For example, the heavy oil may have a viscosity of 3,500 seconds, the diesel oil 30 seconds and the intermediate grade 300 seconds. However, this creates a problem of requiring a further storage area for a third grade of fuel and there is an additional risk of the 300 second blend not producing a perfect mixture and separating out within the storage tank.

The invention is therefore concerned with blending installations which enable two grades of fuel to be blended to provide a grade of intermediate viscosity.

According to the present invention, there is provided a blending installation comprising a circulation pump, a circuit in which fuel is constantly recirculated by the circulation pump, means for introducing into the circuit controlled quantities of fuels of different grades, a throttle device incorporated in the circuit and a feed line, for connecting the circuit to a fuel consuming device such as an internal combustion engine, connected upstream of the throttle device.

By virtue of the fact that the fuel is being constantly recirculated in the closed circuit it is possible to ensure that the different grades do not separate out.

Advantageously, excess fuel is fed back into the circuit from the fuel pumps of the engine, the supply to the engine and the return from the engine being connected into the circuit on opposite sides of a throttle device.

Advantageously, a heater is incorporated in the circuit to ensure that the fuel is at the correct temperature for the internal combustion engine.

Preferably, the blending installation blends high grade and low grade fuel for supplying an internal combustion engine, in which the blending unit comprises pumps connected to respective reservoirs of the fuels and driven in such a manner that the pure high grade fuel is supplied to the engine under operating loads up to a predetermined threshold and above the threshold low grade fuel is blended with the high grade of fuel to increase the proportion of low grade fuel as a function of increasing load.

Whenever high grade and low grade fuels are blended and applied to an engine there is a risk that in the event of a failure in various parts of the blending installation, a fuel of too high a viscosity will be fed to the engine.

Advantageously, the blending installation has connected in parallel therewith a bypass line containing a valve which is arranged to open automatically in response to a failure within the blending installation to provide pure high grade fuel to the internal combustion engine.

The invention will now be described further, by way of example, with reference to the accompanying drawing, which is a block schematic diagram of a blending installation.

Although the invention will herein be described with reference to a marine installation, it will be appreciated that it is equally applicable to other installations, for example to generating sets and diesel powered locomotives.

In a marine installation, it is common to utilise low grade fuel having a viscosity of, say, 3,000 seconds to operate the large slow speed diesels used for propelling the ship. Such engines are designed to be able to cope with the slow burning heavy oil. A ship will often also include diesel engines to drive generators and these are traditionally run on high grade diesel oil from a separate tank. The installation in the accompanying drawings allows the engines to operate on pure diesel oil when the low load conditions so dictate, but also enables the engines to operate with a lower grade blend under high load conditions to allow the running costs to be reduced without the provision of a still further reservoir with fuel of an intermediate grade.

In the accompanying drawing there is shown a diesel engine 10 which may for example be part of a generating set. The fuel for the diesel engine is contained in two reservoirs 12 and 14 which contain diesel oil and heavy oil, respectively. The diesel oil 12 is fed by way of a line 16 containing a metering pump 18 into a recirculation loop generally designated 20. The loop comprises a recirculation pump 22, a static mixer 24, a heater 26, a filter 28, a choke 30 and a second filter 32. A gravity feedline 34 connects the heavy oil reservoir 14 to the recirculation loop 20 in between the choke 30 and the filter 32. A pressure relief valve 36 is connected in parallel with the metering pump 18 and a pressure relief valve 38 is connected in parallel with the circulation pump 22. A supply line 40 for the engine pump is connected upstream of the choke 30 and a return line 42 is connected downstream of the choke 30 in the direction of circulation.

A Bypass line 44 containing a solenoid valve 46 connects the line 16 from the diesel oil reservoir 12 directly to the supply pipe 40 of the engine 10. The solenoid valve 46 is normally closed and only opens in the event of failure in one of the active elements of the recirculation loop 20.

In operation, fuel is supplied from the diesel oil reservoir 12 into the recirculation loop 12 by the metering pump 18 which meters a predetermined amount of fuel into the loop. In the loop, the fuel is constantly recirculated by the circulation pump 22 and reheated by the heater 26 to the correct viscosity. The static mixer 24 ensures proper mixing of the fuels by agitation.

Fuel is taken from the recirculation loop 20 by the supply line 40 of the engine and the fuel not consumed by the engine is returned to the line 42. The purpose of the choke 30 is to ensure a drop in pressure to enable the fuel from the return line 42 to be reintroduced into the recirculation loop 20.

If the amount of fuel taken by the engine from the loop does not exceed the amount metered by the metering pump 18 then only diesel oil enters the recirculation loop and the pressure within the recirculation loop will not drop. Consequently, the neat diesel oil will be supplied to the engine.

As the engine loads increases so does the quantity of fuel consumed by the engine. When the amount of fuel consumed exceeds the amount metered by the metering pump 18 the balance is automatically introduced into the recirculation loop 20 from the heavy oil reservoir 14 through the line 34 by gravity feed assisted by the pressure drop developed by the recirculation pump 22. Consequently, with increasing loads the quantity of fuel taken from the heavy oil reservoir 14 increases, so that as the efficiency of the engine increases with increasing loads so is the viscosity increased to take advantage of the increased efficiency to burn cheaper grade fuel.

In the event of a failure in the electric heater 26, the metering pump 18 or the pump 22, the solenoid valve 46 is activated to bypass the blending unit and feed neat diesel oil to the engine 10. This ensures that fuel of high viscosity or too low a temperature is never supplied to the engine by the recirculation loop 20.

In addition to the elements so far described, the installation includes a diesel oil counter 48 collected downstream of the metering pump to measure the total amount of diesel oil consumed. The pressure relief valves 36 and 38 serve to prevent a pressure build-up in the recirculation loop 20.

A further advantage of the installations described is that without the use of a third reservoir an intermediate grade of fuel is available. Furthermore, because the viscosity is constantly changed with engine loads it is possible always to make use of the cheapest grade of oil appropriate for a given set of operating conditions.

When an engine has been running on cheap grade fuel it is preferable to run the engine on high grade fuel before shutting down in order to flush the system. The described installations facilitates flushing in as much as when the ship enters port its engines will have been reduced from full load and as a result will automatically be operating on higher grade fuel by the time it is desired to shut off the engines.

What I claim is:

1. A blending installation to supply fuel to an engine comprising:
    a closed-loop recirculation circuit for recirculating fuel and including a circulation pump in said loop for recirculating and mixing the fuel in said recirculation circuit totally independent of the operating state of said engine;
    a first source of fuel;
    a metering pump for delivering fuel from said first source to said recirculation circuit at a predetermined rate;
    a second source of fuel and delivery means for delivering fuel from said second source of fuel to said recirculation circuit at a variable rate which is dependent upon the operating state of the engine; said engine being separated from said recirculation circuit and having inlet means coupled to receive fuel from a first location along said recirculation circuit and having outlet means coupled to return unused fuel to said recirculation circuit at a second location along said recirculation circuit.

2. The blending installation of claim 1 wherein said circulation pump is operative to recirculate fuel in said recirculation circuit totally independently of the operating state of said engine.

3. The blending installation of claim 1 further comprising heating means in said recirculation circuit for heating the fuel circulating in said recirculation circuit to a desired temperature level.

4. The blending installation of claim 1 further comprising pressure reducing means in said recirculation circuit arranged between said first and second locations for creating a differential pressure therebetween sufficient to facilitate re-entry of fuel into said recirculation circuit from said engine.

5. The blending installation of claim 4 wherein said second delivery means is coupled to said recirculation circuit at a point between said second location and said circulation pump.

6. The blending installation of claim 1 wherein said recirculation circuit includes heating means for heating fuel in said recirculation circuit to regulate fuel viscosity and pressure reducing means in said recirculation circuit for providing a differential pressure in said circuit to enhance the operation of said heating means.

7. The blending installation of claim 1 wherein said delivery means delivers fuel to said recirculation circuit from said second source of fuel by gravity.

8. The blending installation of claim 1 wherein said first source of fuel contains diesel oil and said second source of fuel contains heavy oil.

9. The blending installation of claim 1 wherein said recirculation circuit further includes filter means for filtering and removing impurities from the fuel circulating therethrough.

10. The blending installation of claim 4 wherein said pressure reducing means comprises a choke, said first and second locations being respectively upstream and downstream of said choke.

11. The blending installation of claim 1 further comprising a bypass line for coupling fuel from said first source of fuel to said engine inlet;
    normally closed valve means being opened responsive to failure of either of said pumps for coupling said first source of fuel to said inlet.

12. The blending installation of claim 1 wherein the metering pump pumps fuel to a location in said recirculation circuit which is downstream of the circulation pump.

13. The blending installation of claim 1 wherein said recirculation circuit includes a mixer for admixing the fuels in said recirculation circuit.

* * * * *